United States Patent Office 3,669,651
Patented June 13, 1972

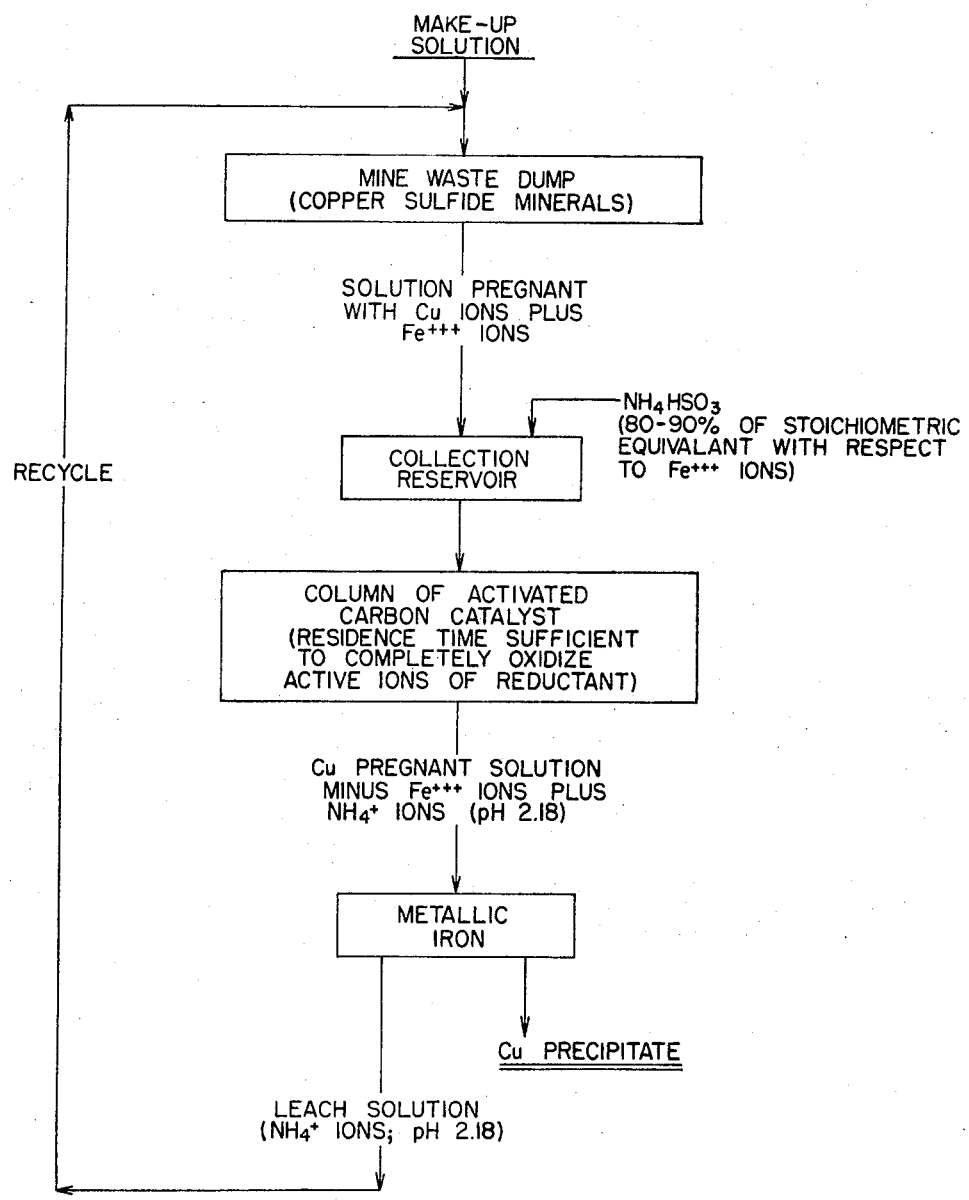

3,669,651
REDUCTION OF FERRIC IONS IN CYCLIC PROCESS OF LEACHING AND PRECIPITATION OF COPPER
Henry R. Spedden, John A. Apps, and Donald F. Lowe, Salt Lake City, Utah, assignors to Kennecott Copper Corporation, New York, N.Y.
Filed Apr. 15, 1970, Ser. No. 28,874
Int. Cl. C22b
U.S. Cl. 75—104
3 Claims

ABSTRACT OF THE DISCLOSURE

Ferric sulfate-sulfuric acid leaching of naturally occurring, copper-bearing materials, such as copper minerals in mine waste dumps, and recovery of the dissolved copper by precipitation on metallic iron are carried out on a cyclic basis, with reduction of ferric ions prior to the copper precipitation step. The pregnant leach solution is treated with a controlled quantity of a water soluble reductant, such as sulfur dioxide or ammonium-bisulfite, for a sufficient period of time in the presence of activated carbon as a catalyst to minimize the ferric ion content thereof while substantially completely consuming the active ions of the reductant so wasteful consumption of the iron precipitant will be prevented while insuring most effective precipitation of the copper, and so as also to provide nourishment, when ammonium bisulfite is employed as the reductant, of iron-oxidizing bacteria normally present in the leach solution.

BACKGROUND OF THE INVENTION

Field

The invention is in the field of hydrometallurgical processing of naturally-occurring copper-bearing materials for the recovery of copper and relates particularly to cyclic leaching processes applied to bodies of such materials, e.g. dumps of mine waste, wherein the dissolved copper in the leach solution emerging from the body is recovered by precipitation on metallic iron and the pregnant leach solution is treated for elimination of ferric ions prior to the precipitation stage of the process.

State of the art

Hydrometallurgical processes of the general type here concerned are well known and widely used for the recovery of copper values from mine waste dumps of copper-sulfide-bearing materials too low in grade to warrant processing by the usual milling procedures which involve concentration of mineral values by froth flotation. Ferric ions are considered necessary in the acidic leach solution to dissolve copper sulfide mineral values present in the waste ore materials being leached. However, any carryover of ferric ions in the pregnant leach solution is detrimental to the copper precipitation or cementation step, in that they wastefully consume the metallic iron precipitant and compete with the copper ions therefor. It is extremely difficult if not impossible as a practical matter to prevent carry-over of ferric ions in the pregnant solution. One way of eliminating the undesirable ferric ions from the pregnant leach solution prior to contacting the metallic iron precipitant therewith is disclosed in copending application Ser. No. 823,695, filed May 12, 1969, by Henry Rush Spedden and Emil E. Malouf and entitled "Improved Process for Precipitating Copper from Solution." This involves contacting the pregnant leach solution with sulfur dioxide under conditions of vigorous agitation of the solution. It has been suggested, see Goren U.S. Pat. No. 3,109,732, issued Nov. 5, 1963, that the ferric ions in a hydrometallurgical solution containing copper values, be reduced to ferrous ions by means of sulfur dioxide or other reductant yielding sulfite or bisulfite ions in the presence of activated carbon as a catalyst. We have found, however, that this is not as easily accomplished as was apparently contemplated by the patentee Goren, even when the pregnant solution and the reductant are passed concurrently through a bed of the activated carbon as done by Goren.

SUMMARY OF THE INVENTION

Our consideration of and experimental work with the concept stated as a general proposition in the Goren patent has shown that complex reactions occur between metallic iron and solutions containing copper ions, sulfite or bisulfite ions, and ferric ions. Thus, the following reactions can occur when ammonium bisulfite, for example, is utilized as the reductant for ferric ions:

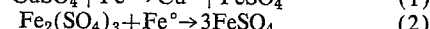
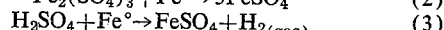
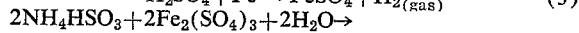
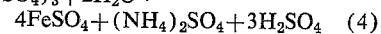
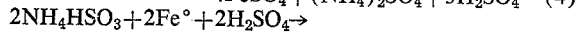
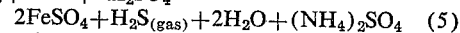
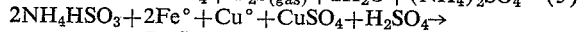
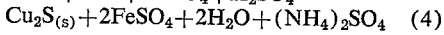

$$CuSO_4 + Fe^\circ \rightarrow Cu^\circ + FeSO_4 \qquad (1)$$
$$Fe_2(SO_4)_3 + Fe^\circ \rightarrow 3FeSO_4 \qquad (2)$$
$$H_2SO_4 + Fe^\circ \rightarrow FeSO_4 + H_{2(gas)} \qquad (3)$$
$$2NH_4HSO_3 + 2Fe_2(SO_4)_3 + 2H_2O \rightarrow$$
$$\qquad 4FeSO_4 + (NH_4)_2SO_4 + 3H_2SO_4 \qquad (4)$$
$$2NH_4HSO_3 + 2Fe^\circ + 2H_2SO_4 \rightarrow$$
$$\qquad 2FeSO_4 + H_{2S(gas)} + 2H_2O + (NH_4)_2SO_4 \qquad (5)$$
$$2NH_4HSO_3 + 2Fe^\circ + Cu^\circ + CuSO_4 + H_2SO_4 \rightarrow$$
$$\qquad Cu_2S_{(s)} + 2FeSO_4 + 2H_2O + (NH_4)_2SO_4 \qquad (4)$$

Equation 4 is indicative of an ideal and highly desirable condition, but we have found that it is only too easy to produce the conditions of Equation 5 wherein obnoxious hydrogen sulfide gas renders the process impractical, or the conditions of Equation 6 wherein cuprous sulfide coats the metallic iron and seriously interferes with the precipitation of copper.

In accordance with the present invention we have found that conditions of the process can be controlled to avoid the undesirable side reactions shown above and to approach the highly desirable ideal situation in which a maximum of metallic iron is available for and is utilized in the copper precipitation or cementation reaction. Moreover, we have found that, when ammonium bisulfite is utilized as the reductant, there is a carryover of ammonium ions in the recycled leach solution that serve as an important nutrient for the iron-oxidizing bacteria normally relied on for regeneration of the spent leach solution. Additionally, sufficient sulfuric acid ($H_2SO_4$) is produced to bring the pH of the recycled leach solution within the range shown to be highly advantageous by Zimmerley et al. U.S. Pat. No. 3,260,593.

The present process requires that no more than from about 80 to 90% of the stoichiometric equivalent of the reductant be added to the pregnant leach solution to reduce ferric ions therein to ferrous ions and that sufficient contact time between the pregnant solution, reductant, and activated carbon catalyst be provided for substantially complete oxidization of the active ions of the reductant Although the process of the invention is discussed herein primarily in connection with the cyclic leaching of copper-sulfide-bearing ore materials, it is clear from the above that the process is applicable to any copper-bearing materials subject to leaching, whether or not the leaching is carried out on a cyclic basis.

THE DRAWING

An embodiment of the process representing the best mode presently contemplated of carrying out the invention is illustrated in the accompanying drawing, in which the single figure is a flowsheet depicting the several stages of the process as applied to a mine waste dump.

DETAILED DESCRIPTION OF THE ILLUSTRATED EMBODIMENT

Except for the novel aspects indicated, the leaching process is carried out in the usual manner. Thus, in the particular instance under consideration recycled leach solution with make-up solution added as required is flowed onto the top of a mine waste dump containing the copper minerals to be leached and is allowed to percolate down through the interstices of the dump to a reservoir or other collection vessel.

In accordance with the invention, the pregnant leach solution is passed through a catalytic bed of activated carbon after ammonium bisulfite (or some other water soluble substance yielding sulfite or bisulfite ions in solution) has been added thereto as a reductant for ferric ions. The amount of the reductant must not exceed from about 80 to 90% of the stoichiometric equivalent with respect to ferric ions present in such leach solution.

Residence time of the pregnant leach-reductant solution in the catalytic bed must be sufficient to substantially completely oxidize the active ions of the reductant.

Following reduction of ferric ions in the manner aforedescribed, the pregnant solution is brought into contact with a metallic iron precipitant. This may be carried out in any suitable manner, e.g. in a customary launder, but is preferably accomplished in precipitation apparatus of the type disclosed by Back et al. U.S. Pat. No. 3,154,411. Utilization of the metallic iron for the recovery of copper is essentially complete.

The copper-depleted solution is recycled to the dump, with or without special regeneration thereof to convert ferrous ions to ferric ions. If no special regeneration procedures are employed, such as the bacterial regeneration reservoir contemplated by Zimmerley et al. U.S. Pat. No. 2,829,964, all conversion of ferrous ions to the ferric ions necessary for leaching purposes will take place by oxidation as an incident of the recirculation procedure and in the upper portion of the dump with the help of the bacteria naturally present therein.

It should be noted that, when ammonium bisulfite is utilized as the reductant for the catalytic reduction of ferric ions to ferrous, ammonia ions are carried over in the reduced pregnant leach solution and through the copper precipitation stage into the spent solution that is recycled to the dump. These provide an important nutrient for the iron-oxidizing bacteria that participate in regenerating such spent solution for further copper leaching effectiveness. Moreover, sulfuric acid resulting from the reduction reaction in the catalytic bed automatically provides the pH control heretofore found advantageous in such a cyclic leaching process.

The following comparative tests demonstrate the utility and highly advantageous results of the present process:

In each instance, pregnant leach soltuion taken fom a quantity of such solution obtained from an important commercial mine dump leaching operation was utilized as the feed solution for the test and, after addition of ammonium bisulfite as the reductant, was brought into contact with activated carbon catalyst by passing it through a column of such catalyst with residence time of 3.6 minutes. The resulting solution was tested for ferric ion reduction and absence of residual bisulfite ions and was then introduced into a precipitation cone of the type disclosed in Back et al. Pat. No. 3,154,411, utilizing powdered iron in amount ten percent over stoichiometric as the precipitant for precipitation of copper. The feed solution had a pH of 2.4 and assayed as follows:

|         | g./l. |        | g./l. |
|---------|-------|--------|-------|
| Cu      | 0.68  | Al     | 6.0   |
| Fe(T)   | 3.80  | Mg     | 6.0   |
| Fe++    | 2.15  | SO₄⁻⁻  | 70.0  |
| Fe+++   | 1.65  |        |       |

Results of the several tests were as follows:

TABLE I

| | Carbon reactor results | | | Powdered iron cone results | | |
|---|---|---|---|---|---|---|
| | Sulfur dioxide added (percent of stoichiometry) | Sulfur dioxide added to feed (g./l.) | Ferric ion reduced (percent) | Sulfur dioxide in cone feed (g./l.) | Iron factor (Fe/Cu) | Copper precipitated (percent) |
| 40 | | 0.38 | 40 | 0.00 | 1.50 | 93 |
| 70 | | 0.66 | 60 | 0.10 | 1.40 | 87 |
| 80 | | 0.75 | 70 | 0.09 | 1.14 | 88 |
| 90 | | 0.85 | 70 | 0.19 | 1.10 | 87 |
| 100 | | 0.94 | 70 | 0.28 | 1.25 | 85 |
| 130 | | 1.23 | 80 | 0.48 | 1.40 | 78 |
| 160 | | 1.51 | 100 | 0.57 | 1.54 | 67 |

In comparison with the above, copper precipitation of the feed solution without ferric ion reduction was as follows:

TABLE II

| Iron factor | | Copper precipitated (percent) |
|---|---|---|
| Theoretical (Fe/Cu) | Soluble (Fe/Cu) | |
| 2.10 | 2.00 | 90 |

Testing of the effluent solutions from the precipitation cone for pH, showed that use of the reductant within the range specified and in accordance with the present process lowered the pH from its initial value of 2.3 to the favorable value of 2.18 for recycling purposes, whereas, with standard procedures not involving reduction of ferric ions, the initial pH was raised to 2.8.

With respect to the carry-over of ammonium ions in the recycled leach solution, it was ascertained by testing of the effluent solutions from the precipitation cone that such carry-over does occur. Its favorable effect on nutrition of iron-oxidizing bacteria and the regeneration of ferrous ions to ferric is indicated by the following tables taken from general tests made to determine the nutrient effect of ammonium ions on bacteria of the type concerned in effluent solution from the copper precipitation stage of the commercial dump leaching operation from which the feed solution of the foregoing tests was taken:

TABLE III.—MAKE-UP OF THE TEST NUTRIENT SOLUTION

| Basal salt | Formula | Amount |
|---|---|---|
| Ammonium sulfate | $(NH_4)_2SO_4$ | 3.00 gram. |
| Potassium chloride | KCl | 0.10 gram. |
| Potassium mono hydrogen ortho phosphate. | $K_2HPO_4$ | 0.50 gram. |
| Magnesium sulfate | $MgSO_4 \cdot 7H_2O$ | Do. |
| Calcium nitrate | $Ca(NO_3)_2$ | 0.01 gram. |
| Distilled water | $H_2O$ | 0.700 liter. |
| 1 N sulfuric acid | $H_2SO_4$ | 0.001 liter. |
| Energy source: ferrous sulfate | $FeSO_4 \cdot 7H_2O$ | 300 ml. of a 14.74% (wt./vol.) solution. |

[Bacterial oxidation of Fe++ ions to Fe+++ ions in a continuous stirrer reactor having a capacity of 15 liters and a feed rate of 7.5 liters per day.]

TABLE IV

| Time (days) | Fe++ oxidation rate (grams/liter per day) | Nutrient added (liters) |
|---|---|---|
| 0 | 0.21 | |
| 2 | 0.21 | |
| 4 | 0.42 | |
| 6 | 0.94 | |
| 8 | 0.99 | |
| 10 | 0.99 | 0.50 |
| 12 | 2.88 | |
| 14 | 2.62 | |
| 17 | 2.51 | |
| 19 | 2.09 | |
| 21 | 1.68 | |
| 24 | 1.69 | |
| 28 | 0.94 | 0.50 |
| 29 | 2.51 | |
| 30 | 3.56 | |
| 34 | 2.46 | |
| 38 | 1.88 | |
| 41 | 1.47 | |

Although the pH of the effluent solution in the tests of Table IV was somewhat higher than that of the effluent solution in the tests representing the process of the invention, experience has shown that moderate differences in pH has no significant effect on bacterial activity.

Even though the process has been particularly described with respect to its application to the leaching of mine waste dumps, for which it is especially useful, it should be realized that other bodies of copper-bearing, materials, especially ore bodies fractured in place, can be treated in similar manner.

Whereas this invention is here illustrated and described with respect to a certain preferred form thereof, it is to be understood that many variations are possible without departing from the inventive concepts particularly pointed out in the claims.

What is claimed is:

1. In a cyclic process for the leaching and recovery of copper values from copper-bearing materials, wherein said materials are contacted by an acidic leach solution containing ferric ions, and the resulting solution pregnant with copper values is brought into contact with metallic iron for the precipitation of copper prior to recycling of the solution, the improvement comprising adding to the pregnant solution a water soluble reductant that yields in aqueous solution a reducing ion selected from the group consisting of sulfite ion and bisulfite ion, said reductant being added in an amount within the range of about 80 to 90% of the stoichiometric equivalent with respect to ferric ions in said solution; and contacting activated carbon catalyst with said pregnant solution in the presence of said reductant for a time sufficient to substantially completely oxidize the active ions of the reductant.

2. The improvement recited in claim 1, wherein the reductant is ammonium bisulfite, whereby ammonium ions are carried over in the recycled leach solution as a nutrient for iron-oxidizing bacteria operative to regenerate ferrous ions in the recycled solution to ferric ions.

3. In a process for the leaching and recovery of copper values from copper-bearing materials, wherein said materials are contacted by an acidic leach solution containing ferric ions, and the resulting solution pregnant with copper values is brought into contact with metallic iron for the precipitation of copper, the improvement comprising adding to the pregnant solution a water soluble reductant that yields in aqueous solution a reducing ion selected from the group consisting of sulfite ion and bisulfite ion, said reductant being added in an amount within the range of about 80 to 90% of the stiochiometric equivalent with respect to ferric ions in said solution; and contacting activated carbon catalyst with said pregnant solution in the presence of said reductant for a time sufficient to substantially completely oxidize the active ions of the reductant.

References Cited

UNITED STATES PATENTS

| | | | |
|---|---|---|---|
| 3,109,732 | 11/1963 | Goren | 75—101 |
| 3,218,252 | 11/1965 | Glover et al. | 75—104 |
| 3,266,889 | 8/1966 | Duncan et al. | 75—101 |
| 2,829,964 | 4/1958 | Zimmerley et al. | 75—104 |
| 3,272,621 | 9/1966 | Zajic | 75—101 |
| 3,260,593 | 7/1966 | Zimmerley et al. | 75—117 |

L. DEWAYNE RUTLEDGE, Primary Examiner

G. T. OZAKI, Assistant Examiner

U.S. Cl. X.R.

75—109, 101 R, 117